(12) United States Patent
Shimada et al.

(10) Patent No.: US 8,097,981 B2
(45) Date of Patent: Jan. 17, 2012

(54) AC/DC POWER CONVERTER USING MAGNETIC ENERGY RECOVERY SWITCH

(75) Inventors: Ryuichi Shimada, Tokyo (JP);
Kazuhiro Usuki, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 29 days.

(21) Appl. No.: 12/525,542

(22) PCT Filed: Jan. 25, 2008

(86) PCT No.: PCT/JP2008/051600
§ 371 (c)(1),
(2), (4) Date: Oct. 18, 2009

(87) PCT Pub. No.: WO2008/096664
PCT Pub. Date: Aug. 14, 2008

(65) Prior Publication Data
US 2010/0090533 A1    Apr. 15, 2010

(30) Foreign Application Priority Data
Jun. 2, 2007    (JP) .................... 2007-026273

(51) Int. Cl.
*H02J 1/00*    (2006.01)
(52) U.S. Cl. .......................................... 307/66
(58) Field of Classification Search .......... 307/66; 363/17, 127
See application file for complete search history.

(56) References Cited

U.S. PATENT DOCUMENTS

| | | | | |
|---|---|---|---|---|
| 4,088,937 | A | * | 5/1978 | Uchida et al. ............. 318/441 |
| 5,283,726 | A | * | 2/1994 | Wilkerson ................. 363/41 |
| 5,657,212 | A | * | 8/1997 | Poon et al. ................ 363/17 |
| 2009/0146504 | A1 | | 6/2009 | Shimada et al. |

FOREIGN PATENT DOCUMENTS

| | | |
|---|---|---|
| JP | H11-018413 A | 1/1999 |
| JP | 2002-369388 A | 12/2002 |
| JP | 2004-260991 A | 9/2004 |
| JP | 2006-353079 A | 12/2006 |
| WO | WO2004/017151 A1 | 2/2004 |

* cited by examiner

*Primary Examiner* — Jared Fureman
*Assistant Examiner* — Daniel Cavallari
(74) *Attorney, Agent, or Firm* — Keiji Masaki (57) ABSTRACT

An AC/DC power converter which charges a secondary battery from an AC power supply and also converts power from the secondary battery to the AC voltage is provided. A capacitor C is connected to DC terminals of the four reverse-conductive type semiconductor switches in a single-phase bridge structure, and a secondary battery is connected via a DC inductance to the semiconductor switches. The semiconductor switches are connected via an AC inductance L with an AC power supply and opposing pairs of the semiconductor switches are alternately turned ON/OFF in synchronization with the phase of the supply voltage. When an AC power supply with a frequency which is lower than the resonance frequency of the LC is connected, the switching will be carried out in a zero-voltage-zero-current condition and AC/DC reversible power conversion is possible just through the control of the gate phase of the switches.

6 Claims, 10 Drawing Sheets

Prior Art

MERS  Dual MERS

AC/DC POWER CONVERTER USING MAGNETIC ENERGY RECOVERY SWITCH

TECHNICAL FIELD

The present invention relates principally to an electric charger to charge a secondary battery for an electric car, a hybrid car or the like from a charging power supply at a garage, the electric charger being comprised of an AC/DC reversible power converter using a magnetic energy recovery switch which carries out a forward conversion from AC power supply to DC and also an inverse conversion from DC to AC.

BACKGROUND ART

Presently, nearly half of the transportation-related energy consumption is covered by oil. Electric cars are expected to proliferate because the proliferation of the electric cars will increase the proportion of coverage of energy consumption by the electricity generated by alternatives to oil, such as nuclear power and natural energy including wind power, solar power or the like that emit less carbon dioxide. Expectations are also placed on hybrid cars that use both a secondary battery and an engine to move the cars, because they can drastically reduce fuel consumption. As a hybrid car whose energy is covered by electricity by a larger ratio, a plug-in hybrid car mainly uses electric energy and uses gasoline as a sub energy, and seems to bridge to a complete electric car.

For charging an electric car, a commercial AC power supply from an electric power system is used, and since infrastructure of electric feeder is already facilitated to each home, charging is possible anywhere. At each home garage, charging of these secondary batteries is carried out mainly during night. Although the capacity per charger is in the order of several kW, local voltage and wide-area frequency may be influenced, when electric power is required in a narrow area with too much concentration. Therefore, operational control for not causing such a problem is necessary.

If a real-time centralized control is realized via the Internet for such a non-urgent load as electric water heater, such a control will serve just like a load regulating power supply, as a buffer for variable electric power such as wind power, contributing to an electric power stabilization. This scheme has already been proposed by the same applicant (see Japanese Patent Publication No. 2006-353079).

Moreover, an electric car or a hybrid car at each home is equal to an electric power storage device deployed at each home. If a conversion from DC to AC is carried out depending on necessity, such car will serve as an emergency power supply (UPS) at each home for its necessary loads, which will offer a countermeasure for a power failure of a commercial electric power line.

SUMMARY OF THE INVENTION

Problem to be Solved by the Invention

Figure 2:
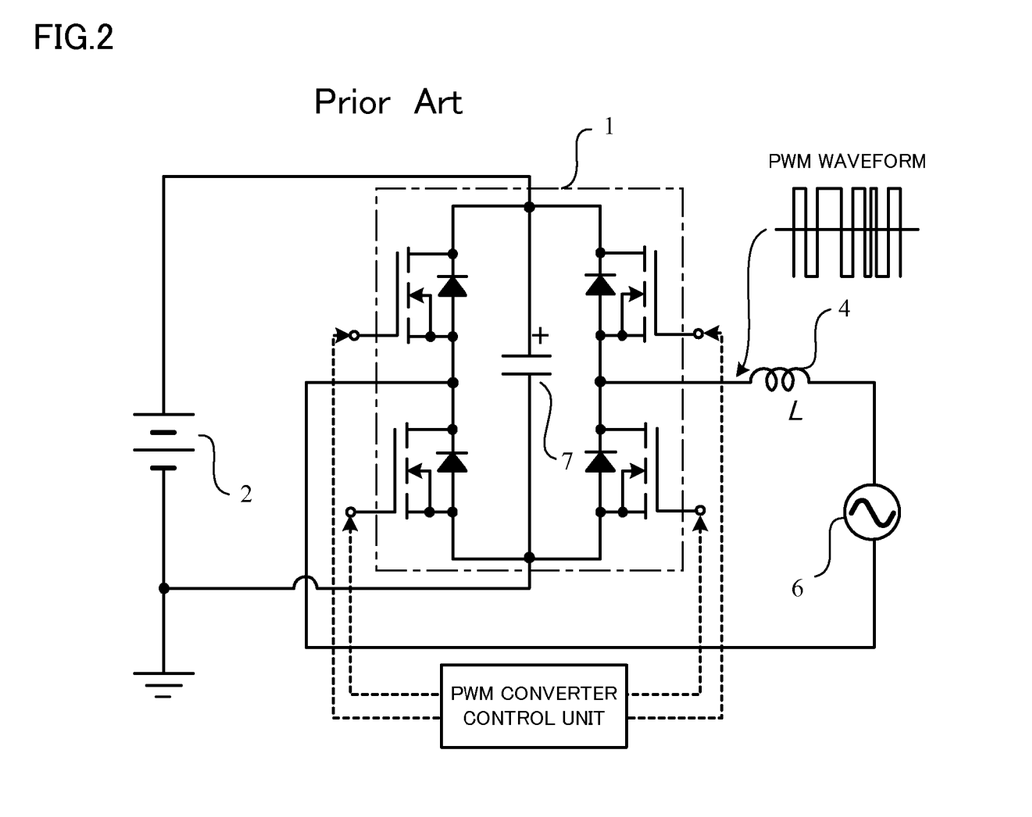
FIG. 2 is a circuit block diagram showing a structure of a conventional PWM converter/inverter.

Although there are such expectations on the electric cars, a conventional battery charger offers forward conversion only just like a diode rectifier or a thyristor rectifier, and therefore cannot serve the above object. FIG. 2 is a circuit block diagram showing a structure of a conventional PWM inverter/converter. As shown in FIG. 2, AC/DC reversible power conversion was carried out using a converter 1 having a bridge structure in such a manner that a high-speed ON/OFF with a frequency which is higher than the frequency of an AC power supply 6 is carried out to generate a pseudo AC voltage having a square-wave voltage wave form (PWM: so called Pulse Width Modulation), and a forward conversion is carried out when the phase of the artificial AC voltage delays to the phase of the AC power supply 6, and an inverse conversion is carried out when the phase of the artificial AC voltage advances to the phase of the AC power supply 6. The converter is connected to the AC power supply 6 via an AC inductance 4. In this instance, there is a merit that the value of the AC inductance 4 can be small because the frequency of the PWM is a high frequency.

A PWM converter generates a high-frequency noise, and, therefore, a filter for such a noise is necessary. Moreover, due to switching loss arising from the many-time switching of semiconductor switches, the efficiency drops, and yet the size of a device for removing the heat of the semiconductors is large.

Figure 3:
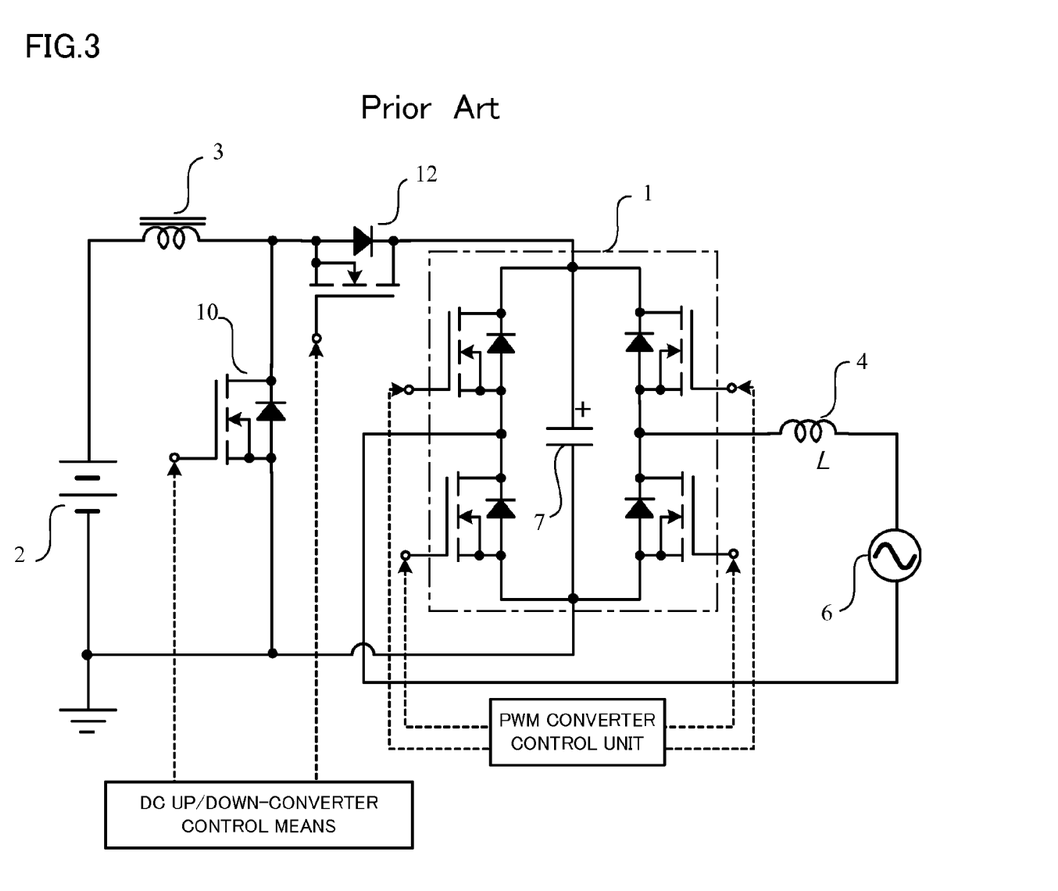
FIG. 3 is a circuit block diagram showing a structure of a PWM converter/inverter with a DC up-converter.

In the case of an inverse conversion, the value of a DC voltage needs to be higher than the peak value of an output of the AC voltage, and when the DC voltage lowers as a secondary battery 2 discharges, the DC voltage needs to be raised. FIG. 3 shows a circuit block diagram of a PWM converter/inverter having a DC up-converter. For example, it was necessary to take a counter measure such as rectifying the voltage with a DC up-converter connected between a secondary battery and a capacitor 7 as shown in FIG. 3. The voltage fluctuates greatly and in a case of a lithium secondary battery the voltage lowers to the approximation of 70% thereof after the discharge.

The present invention was made in consideration of the problems of the conventional AC/DC reversible converter as described above, and it is an object of the present invention to provide an efficient AC/DC power converter for which a voltage rectification with a DC up-converter is unnecessary.

Means for Solving the Problem

The present invention relates to an AC/DC power converter having both functions of a forward conversion from AC to DC and an inverse conversion from DC to AC. The object of the present invention can be achieved by an AC/DC power converter having functions of a forward conversion from AC to DC and an inverse conversion from DC to AC, comprising: a bridge circuit having four reverse-conductive type semiconductor switches; a capacitor 7 connected between DC terminals of the bridge circuit for storing magnetic energy existing when a current is cut off; a magnetic-energy-recovery two-way switch provided with control unit for controlling ON/OFF of each of the reverse-conductive type semiconductor switches by sending control signal to a gate of each of the reverse-conductive type semiconductor switches; an AC inductance 4 having one end connected to an AC power supply 6 and an other end connected to an AC terminal of the bridge circuit; and a DC inductance 3 having one end connected to a secondary battery 2 serving as a DC power supply and the other end connected to a DC terminal of the bridge circuit; wherein a capacitance C of the capacitor 7 and/or an inductance L of the AC inductance 4 are set to such values as to make the resonance frequency determined by the C and L higher than the frequency of the AC power supply 6; and wherein the control unit controls the control signals so as to turn simultaneously ON/OFF the pairs of the reverse-conductive type semiconductor switches diagonally located in synchronization with the voltage of the AC power supply 6, and to prevent the two pairs of the reverse-conductive type semiconductor switches from being turned ON simultaneously; and the control unit further controls the control signals in such a manner that the phase of the control signals delays as compared to the phase of the AC power supply when a forward conversion is carried out, and the phase of the control signals advances as compared to the phase of the AC power supply when an inverse conversion is carried out.

Also the above object of the present invention can be effectively achieved by a AC/DC power converter, wherein an AC switch 5 whose ON/OFF is controlled by the control unit is inserted between the AC inductance 4 and the AC power supply 6; wherein when the control unit detects a power failure or an instantaneous voltage down of the AC power supply 6, the control unit opens the AC switch 5 to break the AC power supply 6 and generates a pseudo synchronizing signal in place of the AC power supply and changes over to an inverse power conversion by making the phase of the control signals lead to carry out an inverse power conversion of the electric power of the secondary battery 2 or other DC power supply, thereby continuing the supply of AC power to the AC load.

Moreover, the above object of the present invention can be more effectively achieved by inserting a DC switch either between the DC inductance 3 and the secondary battery 2 or between the DC inductance 3 and a DC terminal of the bridge circuit, or by making the control unit provided with communication unit for communicating with outside.

Furthermore, the present invention relates to a system for controlling charge/discharge of the secondary battery using the AC/DC power converter, and the above object of the present invention can be achieved by a system for controlling a charge/discharge of a secondary battery, wherein one or a plurality of AC/DC power converters according to the previous claim, connected to an AC power supply of an electric system and a secondary battery serving as a DC power supply and a server of an external centralized-control center 9 are connected so that they can communicate with each other via a communication line such as the Internet or the like; wherein the server monitors demand and supply of the electric power of the electric power system as well as charging condition of the secondary battery; and the server sends a command of forward power conversion or inverse power conversion to the control unit in accordance with the demand and supply and controls the charge/discharge of the secondary battery, thereby stabilizing the electric power of the electric power system.

BEST MODE FOR CARRYING OUT THE INVENTION

Figure 10:
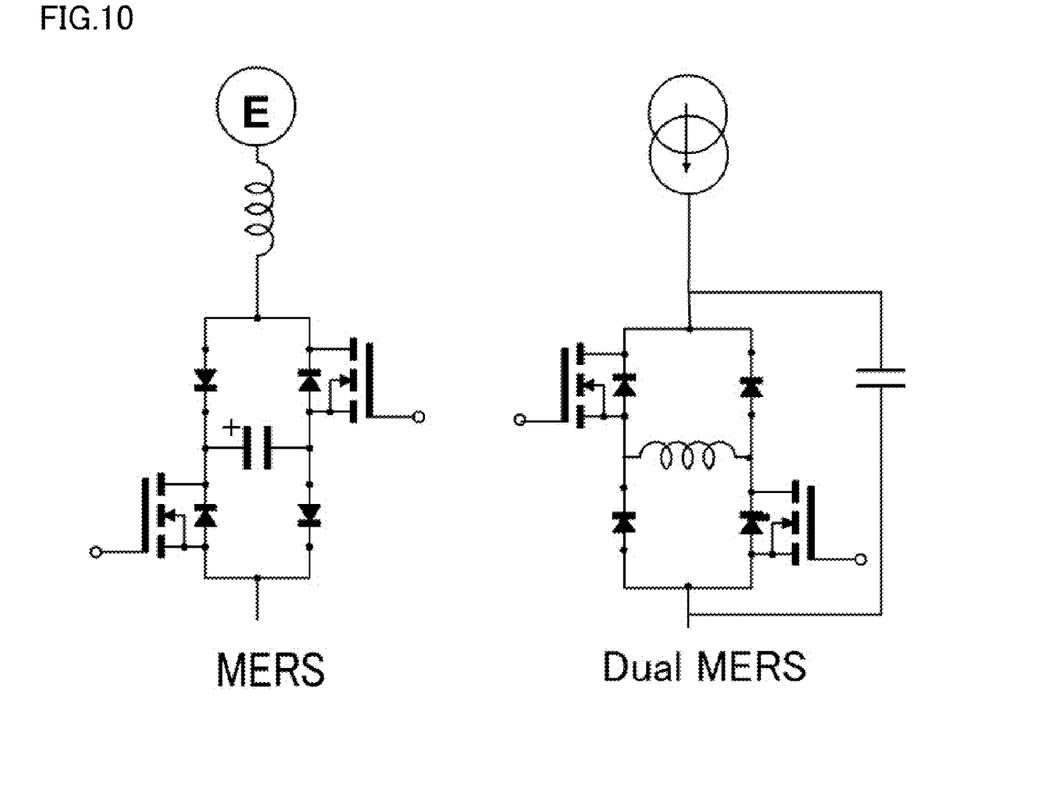
FIG. 10 are diagrams for explaining an advancement of the magnetic energy recovery switches.

The present invention uses a magnetic energy recovery switch 1 which was disclosed in the Japanese Patent No. 3634982. An AC inductance 4 which is arranged between the magnetic energy recovery switch 1 and an AC power supply 6, and a capacitor 7 are made to continue resonance oscillation in which magnetic energy moves back and forth to and from the capacitor 7 by alternately turning ON/OFF the semiconductor switch pairs (SW1, SW3) and (SW2, SW4). FIG. 10 shows a circuit in which a magnetic energy recovery switch is used in series to activate an inductance which stores magnetic energy.

Figure 11:
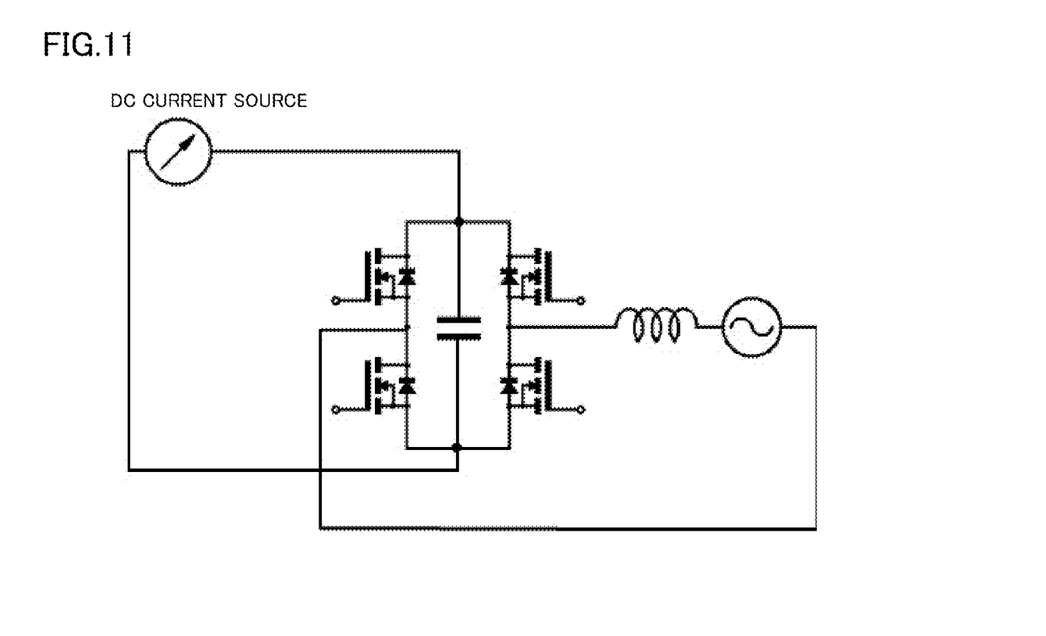
FIG. 11 is a diagram for explaining an advancement from an oscillator by the magnetic energy recovery switch to an AC/DC inverter.

FIG. 10 shows both Magnetic Energy Recovery Switch (MERS) that has been publicly known and the dual circuit thereof (Dual MERS), in which a voltage supply is changed to a current supply, L is changed to C, and a series connection is changed to a parallel connection. FIG. 11 shows a method of further connecting an AC power supply to an AC power oscillating circuit in which a DC current supply is connected to a capacitor and electric power is inputted from DC.

Figure 1:
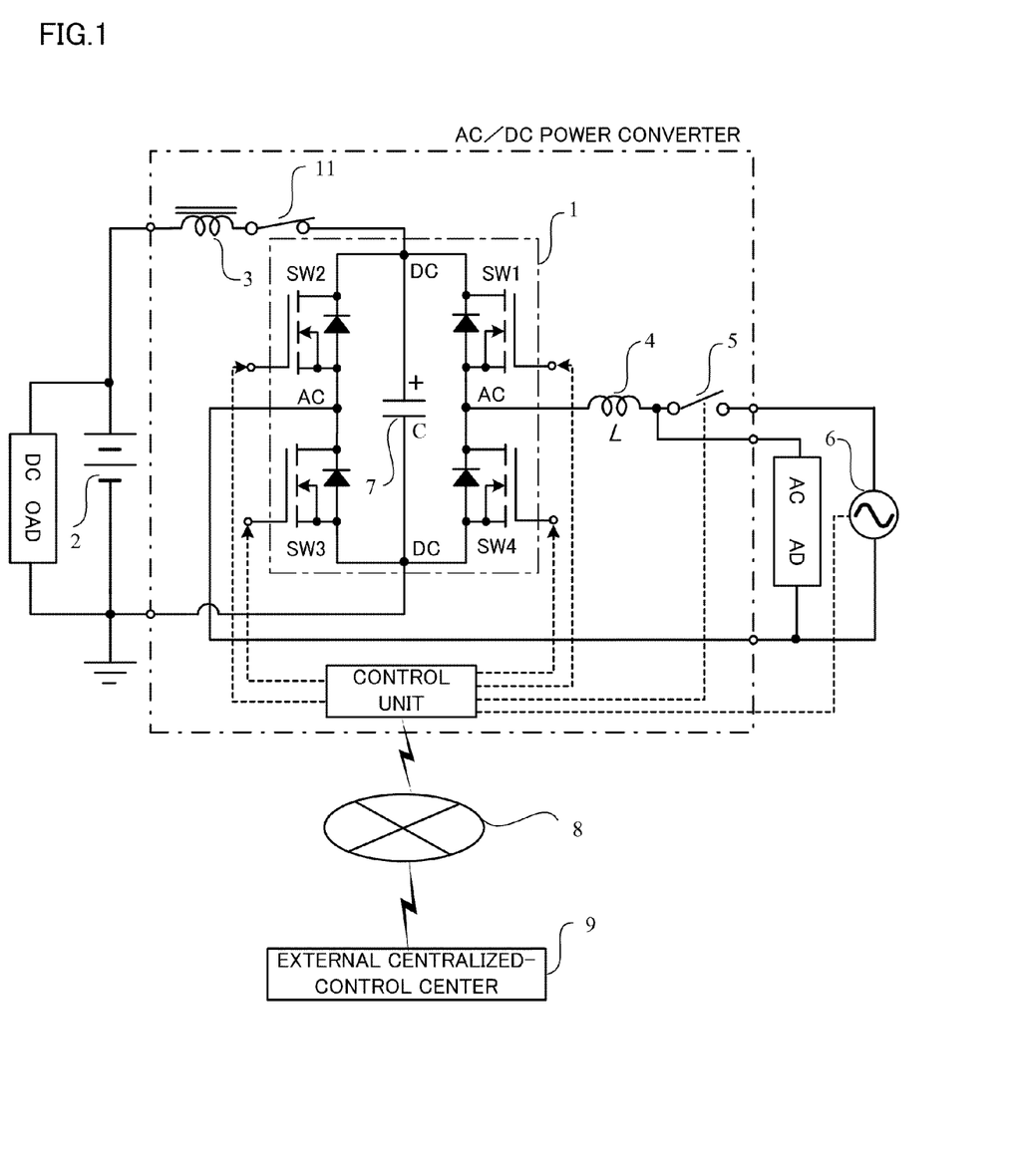
FIG. 1 is a circuit block diagram showing a structure of an AC/DC power converter of the present invention.

Through the development of these magnetic energy recovery switches the present invention, as is shown in the FIG. 1, achieves reversible conversions from DC to AC in which the switching loss is reduced with a minimum elements and ON/OFF control of only one time per cycle, and furthermore, the resonance frequency between the DC capacitor 7 of the bridge circuit and the AC inductance 4 that is arranged for connection to the AC power supply 6 is set close to the frequency of the AC power supply 6, thereby shaping the distortion of the wave form arising from the ON/OFF. Furthermore, the AC inductance 4 constitutes a series filter for the power supply frequency; therefore, a high-frequency noise from an external system or an AC load can be prevented from entering.

Also by setting a resonance frequency, determined by the capacitor 7 and the AC inductance 4, higher than the AC power supply frequency, the capacitor 7 has a period after each discharge during which the voltage becomes zero, thereby realizing an ideal switching for each semiconductor switch, namely ON/OFF at zero voltage and zero current, which further serves to a smaller loss.

Connecting a DC power supply 2 to the both ends of the capacitor 7 via a DC inductance 3 realizes a forward conversion when the average voltage of the capacitor 7 which oscillates twice the frequency of the AC power supply is higher than the DC voltage, and realizes an inverse conversion when the average voltage of the capacitor is lower than the DC voltage. The voltage of the oscillating capacitor 7 can be both raised and lowered by the control through making the phase of gate signals of semiconductor switches advance or delay to the phase of the AC power supply 6.

In the present invention, the PWM control which used to be carried out in the conventional reversible converter is not carried out; therefore there is no accompanying noise; hence harmonic filter is unnecessary.

The control unit not only operate these power supplies but also is equipped with a communication unit (not shown) to communicate with the outside, and has a function to send data to and receive commands from an outside centralized-control center 9 (comprising servers) via communication line 8 such as the Internet or the like. With a command from outside, charging power is varied, and, as a result, contributing to the stabilization of the local electric power is possible.

Embodiment 1

An embodiment of the present invention is shown in FIG. 1. Reverse-conductive type semiconductor switches are connected in a bridge structure and a capacitor 7 for storing the magnetic energy is connected to DC terminals thereof. This capacitor 7, unlike the capacitor of the conventional single-phase inverter, has a small capacity and is meant for just storing the magnetic energy, and the capacitor gets charged to the peak voltage and discharged to zero voltage at each half cycle.

The wave form for charging and discharging should be approximated to the angle frequency $\omega_0$ of the AC power supply 6. The relation between the capacitance C and the AC inductance L is as follows:

$$LC = \omega_0^{-2} \quad (1)$$

Moreover, making the value of C slightly smaller than in the equation (1) provides a period that is generated after each half cycle of discharge and during which the voltage is zero. This will make the switching of semiconductor switches easier. It is a characteristic of the present invention that the voltage supply capacitor 7 of the single-phase inverter has, unlike the conventional PWM converter, a drastically smaller capacity.

Since the voltage of the capacitor 7 oscillates, a DC inductance 3 which smoothes enough in view of the oscillation frequency, is used for connecting with the DC circuit. The oscillation frequency is twice $\omega_0$ and the voltage is about the average value of the AC voltage.

Therefore, even if the voltage of the DC power supply is smaller than the voltage supply of the conventional PWM inverter, an inverse conversion is possible.

Various batteries, DC output of an engine generator, fuel batteries or the like, or any combination thereof may be used as a DC power supply 2, and a DC load is also connected. Here an explanation will be given for a case when a lithium ion secondary battery which can charge and discharge is used.

A DC power supply is connected with an AC power supply 6 via an AC inductance 4. In order to shape the current waveform, a large reactance is necessary. In the present embodiment a reactance voltage within the range of 50 to 100% is selected. When this inductance is connected through a transformer to an AC system, a leakage of the transformer can be utilized, therefore, not causing new loss.

An AC inductance 4 is connected to the AC power supply 6 via an AC load and an AC switch 5. The AC switch 5 facilitates that the AC load can be kept being operated even if being separated from the AC power supply 6, when an abnormality such as a power failure takes place in the upper stream of the AC electric power.

Also when there is no need of charge/discharge for a secondary battery 2, the DC inductance 3 is cut off by a DC switch 11 to let the magnetic energy recovery switch operate alone as a resonance voltage supply so that the magnetic energy recovery switch can receive reactive power from the system either advancing or delaying to the phase of the AC power supply 6.

Figure 4:
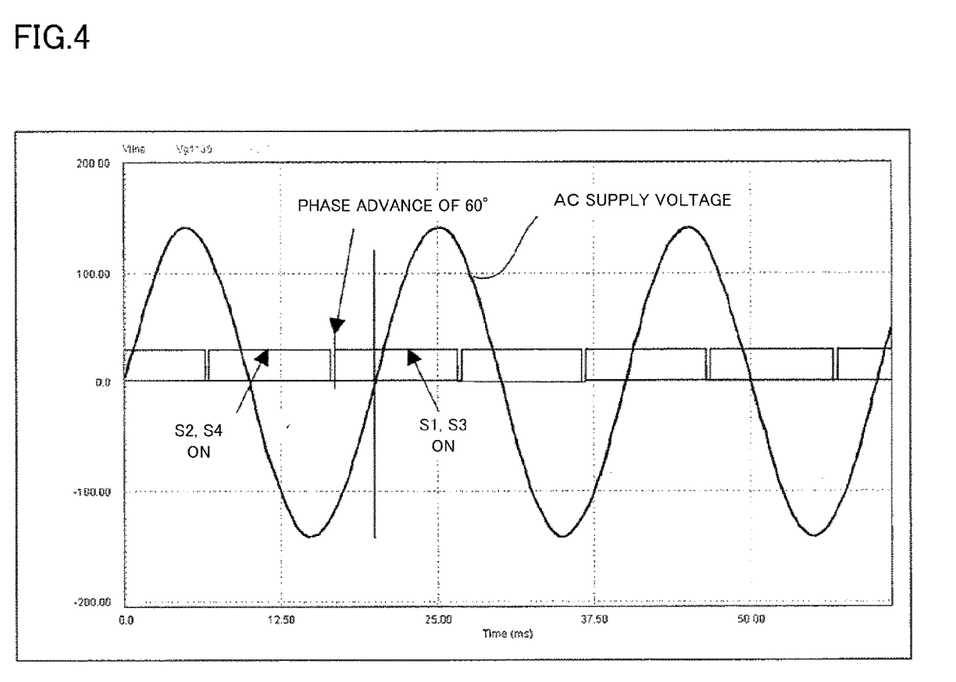
FIG. 4 is a chart showing a relation between an AC supply voltage and a phase of the gate signals of semiconductor switches.

The control unit has a function to detect the voltage phase of the AC power supply 6 and a function to send necessary gate signals to four semiconductor switches (SW1-SW4). The control unit send signals simultaneously to the pairs of semiconductors (SW1, SW3 and SW2, SW4) diagonally located; however, the control unit does not send ON signals simultaneously to the semiconductors positioned in the relation of above and below. This is because the capacitor voltage gets short-circuited. When the gate of one switch of a pair of the switches which are ON is turned OFF, the charge/discharge of the capacitor stops, and the voltage wave form can be shaped. When the phase of the gate signals is controlled to delay as compared to the phase of the AC voltage, the conversion of the power is in the forward conversion mode from AC to DC, and when the phase of the gate signal is controlled to advance as compared to the phase of the AC voltage, the conversion of the power is in the inverse conversion mode from DC to AC. The forward/inverse conversion can be controlled continuously through the change from the advance to the delay of the phase. FIG. 4 shows a relation between the AC supply voltage and the gate signals.

Figure 9:
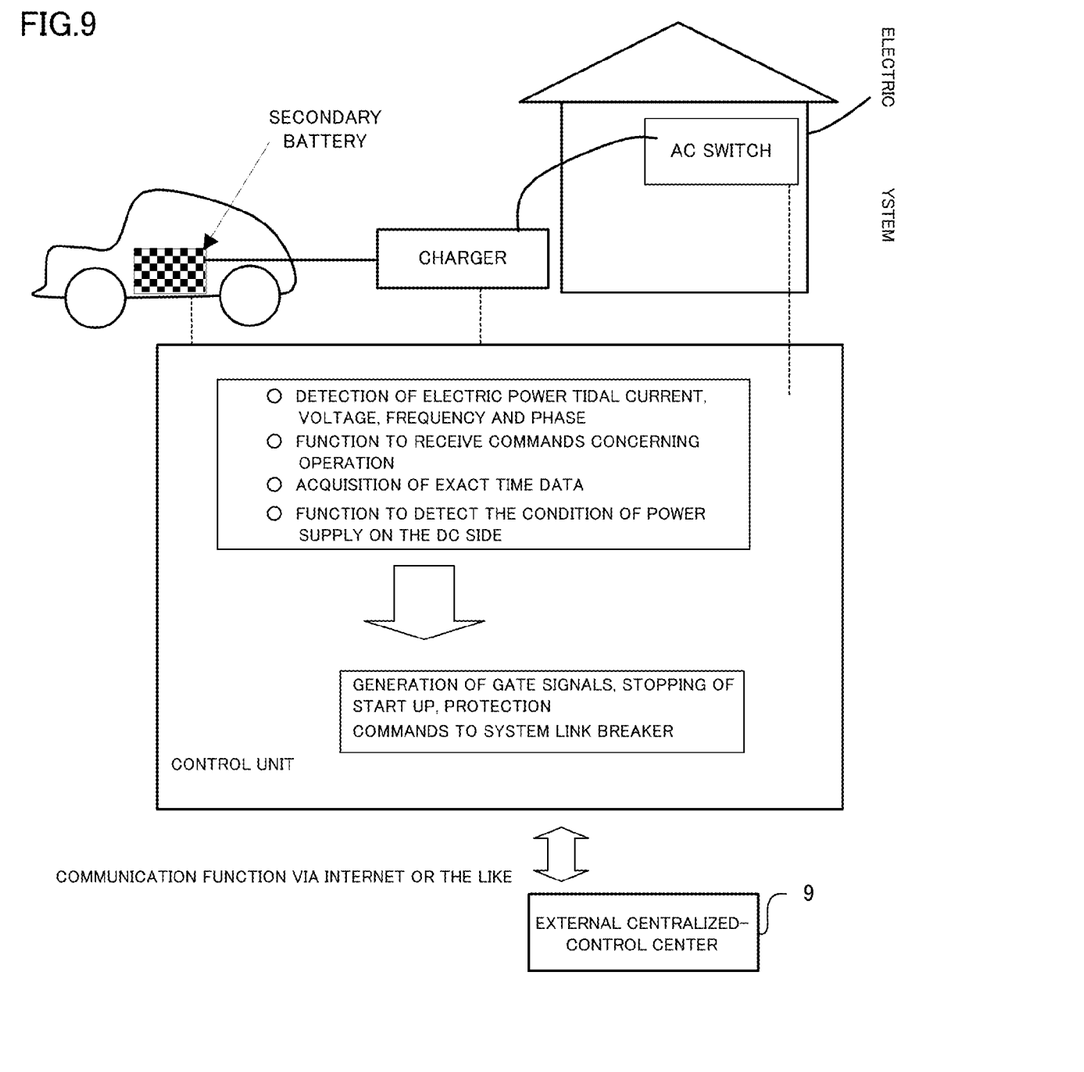
FIG. 9 is a bloc diagram showing functions of control unit.

The functions of the control unit are shown in FIG. 9. Via a communication line 8, such as the Internet or the like, it becomes possible to dynamically increase or decrease the charging power in conjunction with a server at an external centralized-control center 9. The effect of the above is, as explained in the Patent Literature 1 using an electric water heater as an example. For a power generation apparatus using natural energy, such as wind power generation and solar power generation, in which generation condition changes as time passes in a cycle of a few scores of seconds, the charging power supply (secondary battery) of the present invention can be a variable load which serves as a buffer. There is no problem if the power of charging the secondary battery fluctuates as time passes, because, ultimately, only the integrated volume of the charged energy is of concern.

In this instance, an electric power network or an electric power company can reduce an operation for maintenance of the system frequency, namely LFC control, using generated electric power. In a case where, for example, a large number of plug-in hybrid cars are used, it is possible by an AC/DC power converter of the present invention to charge such cars at garages through a centralized control via the Internet, thereby contributing to the stabilization of the electric power system during night and also eliminating the need of the power generation equipments for LFC control and power generation equipments at the time of failure; and furthermore it is desired to serve as a fluctuation buffer for the solar power generation and/or the wind power generation.

In the future when the marketability of the electric power advances, a wind power generation company, for example, via this external centralized-control center 9, can generate and consume in real time the same amount of electric power to enable a direct sale and purchase of the electric power just letting the generated electric power pass through the electric system.

The external centralized-control center 9 collects a large volume of data concerning AC/DC power converters and send, from among data of electric system or the like, optimum operation control data to each AC/DC power converter.

Simulation of the Embodiment

Analysis results of a simulation will be shown. The circuit constant are as follows:
1. reverse-conductive type semiconductor switches: S1, S2, S3, S4 (P-MOSFETs; conduction loss is ignored.)
2. DC power supply (secondary battery): 100V or 140V
3. DC inductance: 120 mH
4. AC inductance: 30 mH
6. AC power supply: 50 Hz, peak value 141V 7. voltage supply capacitor: 150 μF In the relation between gate signals and voltage phase, a case in which the phase of the gate signals has a leading angle of 60° is shown in FIG. 4.

Figure 5:
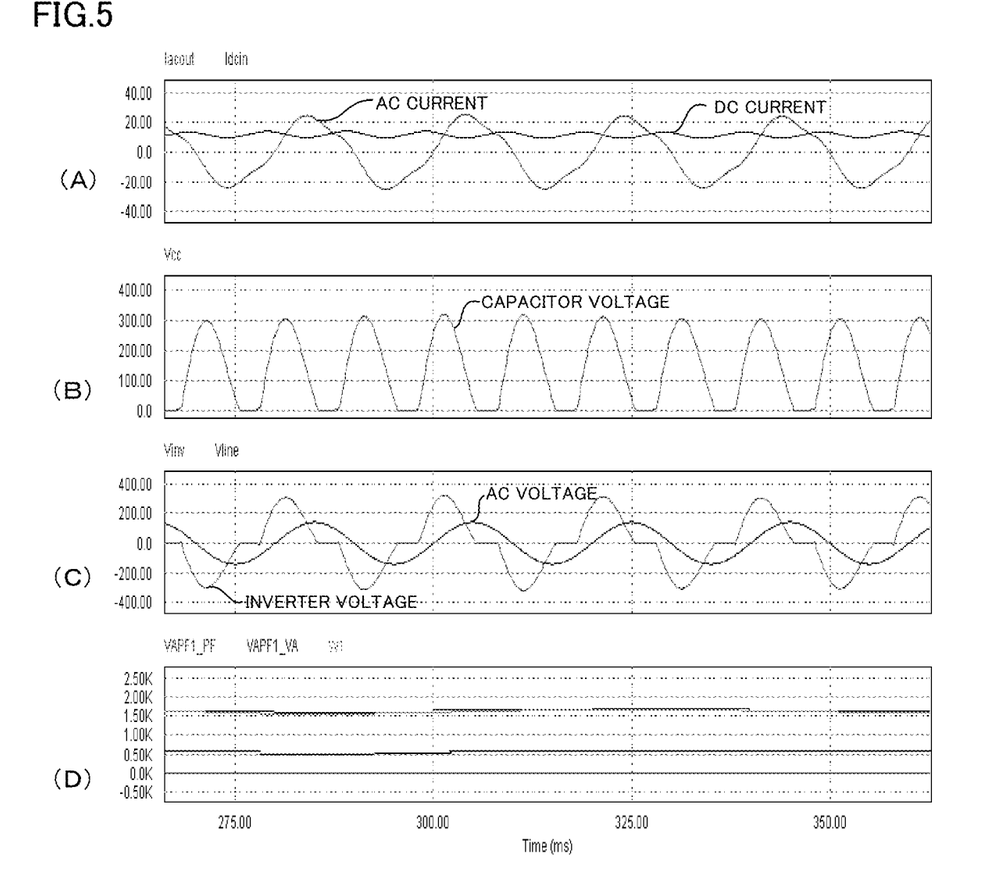
FIG. 5 shows simulation results 1 (inverter operation for an inverse conversion with a DC voltage 140V, a phase lead of 30°)

An inverse conversion from DC to AC with 140V and a leading angle of 30° for inverse conversion is shown in FIG. 5.

Figure 6:
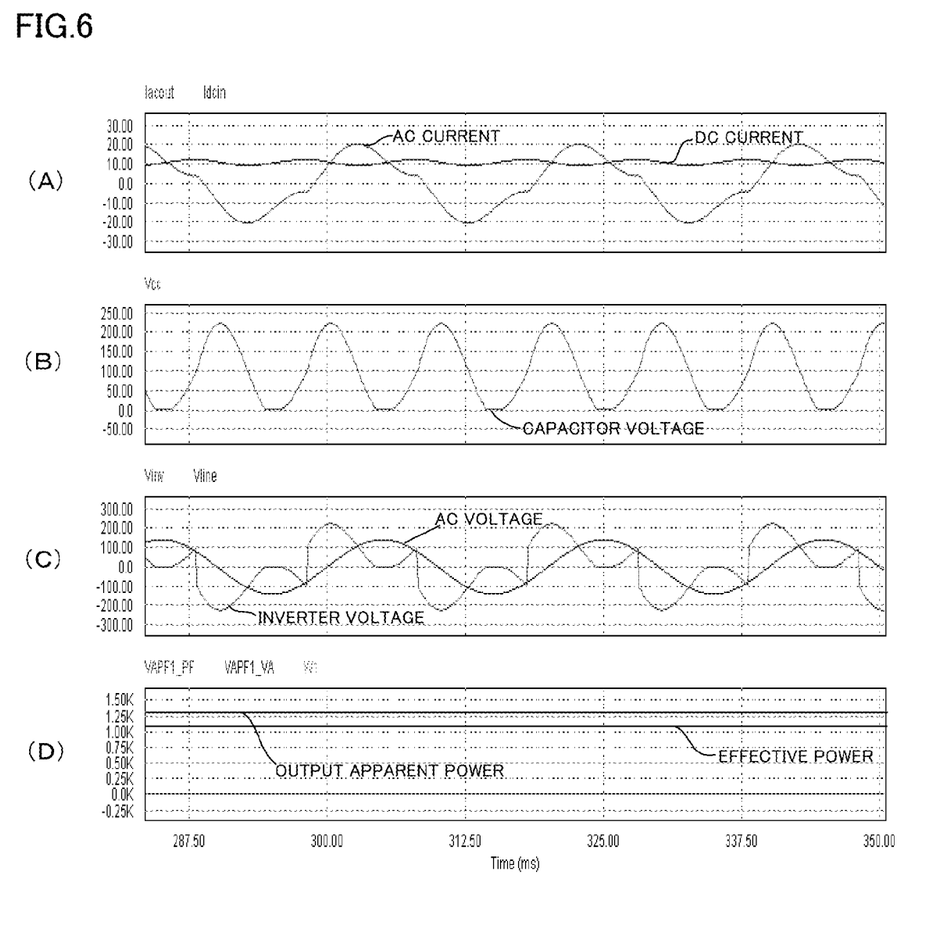
FIG. 6 shows simulation results 2 (inverter operation for an inverse conversion with a DC voltage 100V, a phase lead of 30°)

An inverse conversion from DC to AC with 100V and a leading angle of 30° for inverse conversion is shown in FIG. 6.

Figure 7:
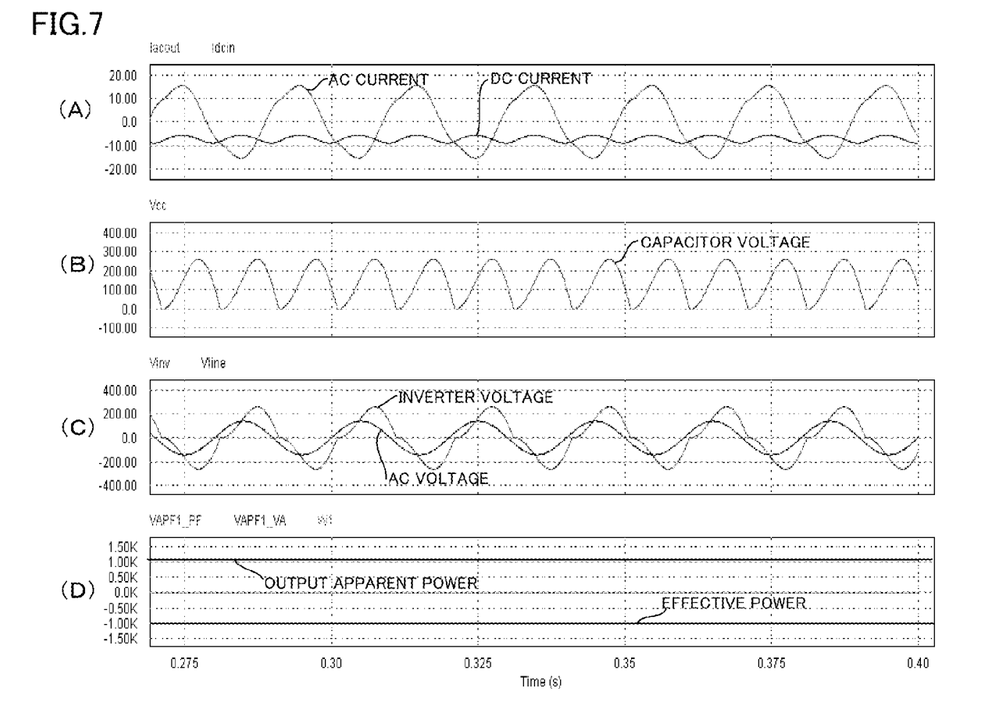
FIG. 7 shows simulation results 3 (converter operation for a forward conversion with a DC voltage 140V, a phase lag of 30°)

A forward conversion from AC to DC with 140V and a lagging angle of 30° for forward conversion is shown in FIG. 7.

Figure 8:
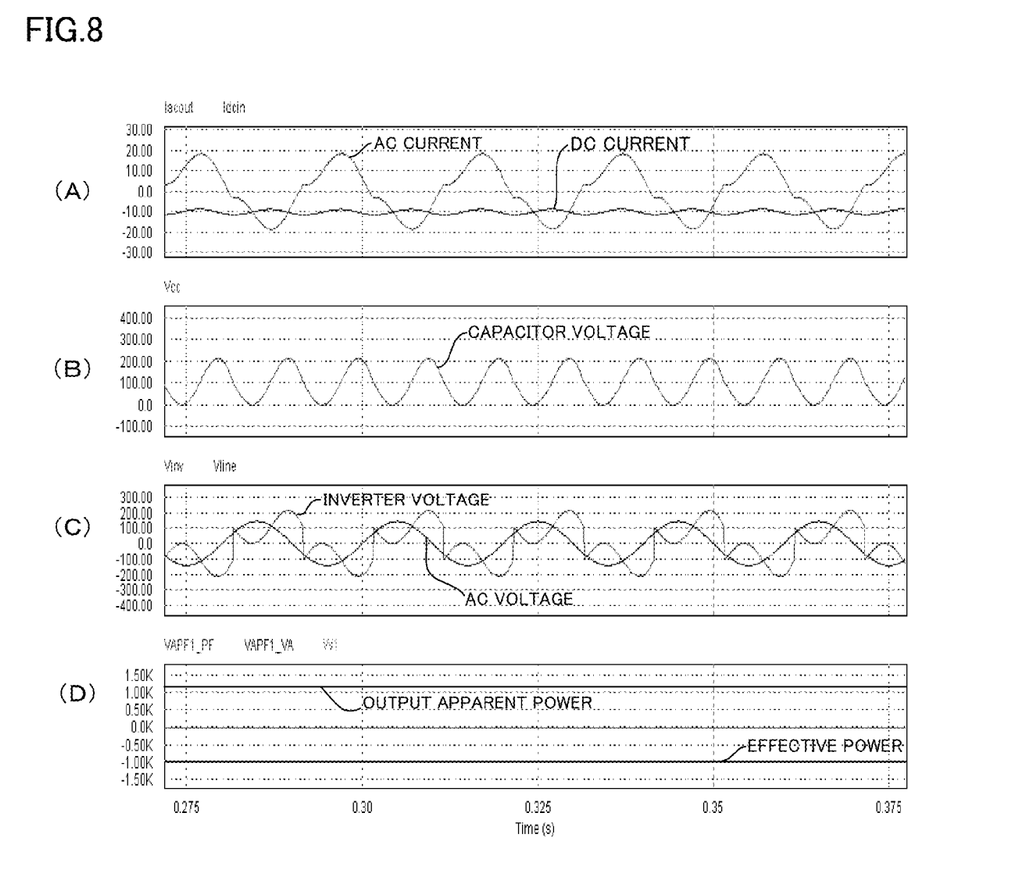
FIG. 8 shows simulation results 4 (converter operation for a forward conversion with a DC 100V, a phase lag of 30°)

A forward conversion from AC to DC with 100V and a lagging angle of 30° for forward conversion is shown in FIG. 8.

Electric power control by phase control is shown in List 1.

List 1 In case of DC voltage having 140V, Electric Power Acquired by Phase Control

|  | Phase Advance Angle | | | | |
| --- | --- | --- | --- | --- | --- |
|  | 60° | 30° | 0° | −30° | −60° |
| AC Current | 23 A | 16.6 A | 5.5 A | 10.8 A | 13.6 A |
| Power Factor | 0.71 | 0.99 | 0.32 | −0.95 | −0.99 |
| Electric Power | 2180 W | 1671 W | 180 W | −1081 W | −1350 W |

Even if the voltage of DC decreases to the effective value or the average value of AC, the inverse conversion is still possible. Conventionally a PWM voltage needed the peak voltage of an AC voltage, and when the voltage is low, the DC voltage has a lagging power factor; therefore boosting up of the DC voltage was often carried out by a DC up-converter as shown in FIG. 3. According to the present invention, owing to a boost up effect of the DC inductance 3 inverse conversion is possible even if the DC voltage decreases to an around 70% level.

Concerning the control at the time of power failure, as it is a characteristic of the present invention that just through the phase control of the gate control signals a change over from a forward conversion to an inverse conversion can be carried out, charging by an AC power supply 6 is immediately stopped and the AC power supply is broken by an AC switch 5, when the AC power supply has a power failure or an instantaneous voltage down; and an inverse conversion is carried out from a DC power supply 2 to continue operating an AC load. For such purpose the AC switch 5 is provided.

As forward conversion from AC to DC and inverse conversion in the reverse direction can be controlled by the phase control of the gate signals, the power converter of the present invention possesses a function to contribute to a power stabilization of electric power system or microgrids receiving commands of external integrated-and-centralized-control center 9 via communication function such as Internet.

In the AC/DC power converter of the present invention a larger AC inductance 4 is necessary compared with conventional PWM converters; as a result, however, the current wave form comes to have drastically less harmonics with the ON/OFF of one pulse per one cycle in principle. Although there remains a slight distortion due to subharmonics, such distortion will disappear when the converter is made into a three-phase converter. Owing to the decrease of the number of times of ON/OFF switching, the switching loss can be greatly reduced.

As compared with the conventional PWM converters, the size and capacity of the capacitor in the DC link part can be reduced to 1/10 or 1/20. When the principle of the magnetic energy recovery switch is utilized as is in the present invention, the DC link capacitor 7 is only meant for storing magnetic energy, and, therefore, can be miniaturized in comparison with the PWM converters.

As the resonance frequency determined by the capacitance C of the capacitor and the AC inductance L is set to a value higher than the frequency of the AC power supply, the semiconductor switches are turned OFF when the capacitor has zero voltage, and yet the current does not surge immediately because of the existence of the inductance; hence, a so-called ideal zero-voltage-zero-current switching for semiconductor switches can be realized.

INDUSTRIAL APPLICABILITY

If the AC/DC power converter of the present invention is adopted as a charging system for electric cars and plug-in hybrid cars which are expected to be commercialized in the near future, two-way charge/discharge of forward conversion and inverse conversion is possible; and while it is considered, concerning the future electric system in which nuclear power generation is to be advanced, that the shortage of frequency control ability during night is supposed to be caused, the present invention, then, will support conventional variable-speed pumping up power generation.

Moreover, when marketability of electric power advances, transaction of electric power can be conducted in such a manner that electric power sold from the wind power generation company is purchased from the electric power market; and the generated electric power by wind power generation is received real time in accordance with the varied volume of the wind power generation; this way it can be said that such a system that charging of the electric cars are considered to be achieved completely by wind power generation can be realized, if the above system does not bring about a burden to the electric system and delivery charge payment is possible for rental charge of the electric wires and feeders. Electric cars can be operated by completely renewable energy. Such will be a business model that promotes introduction of natural energy. Or if electric cars are charged only at night when nuclear power generation is a major power generation system, it can be said that such electric cars are certainly operated with energy which does not emit carbon dioxide.

For realizing these business models the external integrated-and-centralized-control center 9 of the outside bears a major role. The external integrated-and-centralized control center 9 of the external controls not only the frequency of the electric power system but also grasps all the AC voltages and phases connected to AC/DC power converters (charger) dispersed in the district; and, therefore, the center controls the AC/DC power converters to charge/discharge so as to buffer the fluctuation of the voltage in the district, thereby possibly playing the role of a stabilizing apparatus and an electric storage apparatus for electric system in the district and dispersed microgrids.

Various operation methods can be possible depending on the future policies and economic models such as transaction of carbon dioxide emission rights or the like; however, the core of such methods will be the two-way AC/DC power converter for both forward and inverse conversions of the present invention.

The invention claimed is:

1. An AC/DC power converter having functions of a forward conversion from AC to DC and an inverse conversion from DC to AC, comprising:
   a magnetic-energy-recovery two-way switch including a bridge circuit being comprised of four reverse-conductive type semiconductor switches, a capacitor connected between DC terminals of the bridge circuit for storing magnetic energy existing when a current is cut off, a control unit for controlling ON/OFF of each of the reverse-conductive type semiconductor switches by sending control signal to a gate of each of the reverse-conductive type semiconductor switches;
   an AC inductance having one end connected to an AC power supply and an other end connected to an AC terminal of the bridge circuit; and
   a DC inductance having one end connected to a secondary battery serving as a DC power supply and an other end connected to a DC terminal of the bridge circuit;
   wherein a capacitance C of the capacitor and an inductance L of the AC inductance are set to such values as to make the resonance frequency determined by the C and L higher than the frequency of the AC power supply; and
   wherein the control unit controls the control signals so as to turn simultaneously ON/OFF the pairs of the reverse-conductive type semiconductor switches diagonally located in synchronization with the voltage of the AC power supply, and to prevent the two pairs of the reverse-conductive type semiconductor switches from being turned ON simultaneously; and the control unit further controls the control signals in such a manner that the phase of the control signals delays as compared to the phase of the AC power supply when a forward conversion is carried out, and the phase of the control signals advances as compared to the phase of the AC power supply when an inverse conversion is carried out.

2. The AC/DC power converter according to claim 1, wherein an AC switch whose ON/OFF is controlled by the control unit is inserted between the AC inductance and the AC power supply;
   wherein when the control unit detects a power failure or an instantaneous voltage down of the AC power supply, the control unit opens the AC switch to break the AC power supply and generates a pseudo synchronizing signal in place of the AC power supply and changes over to an inverse power conversion by making the phase of the control signals advance to carry out an inverse power conversion of the electric power of the secondary battery or other DC power supply, thereby continuing the supply of AC power to the AC load.

3. The AC/DC power converter according to claim 2, wherein a DC switch is inserted between the DC inductance and the secondary battery or between the DC inductance and a DC terminal of the bridge circuit.

4. The AC/DC power converter according to claim 2, wherein the control unit is provided with communication unit for communicating with outside.

5. The AC/DC power converter according to claim 1, wherein a DC switch is inserted between the DC inductance and the secondary battery or between the DC inductance and a DC terminal of the bridge circuit.

6. The AC/DC power converter according to claim 1, wherein the control unit is provided with communication unit for communicating with outside.

* * * * *